United States Patent [19]

Negi

[11] 4,070,703
[45] Jan. 24, 1978

[54] CONTROL STORE ORGANIZATION IN A MICROPROGRAMMED DATA PROCESSING SYSTEM

[75] Inventor: Virendra S. Negi, Pepperell, Mass.

[73] Assignee: Honeywell Information Systems Inc., Waltham, Mass.

[21] Appl. No.: 726,888

[22] Filed: Sept. 27, 1976

[51] Int. Cl.$^2$ .............................................. G06F 9/00
[52] U.S. Cl. .................................................. 364/200
[58] Field of Search ............................. 364/200, 900

[56] References Cited

U.S. PATENT DOCUMENTS

| | | | |
|---|---|---|---|
| 3,526,878 | 9/1970 | Bennett et al. | 364/200 |
| 3,764,996 | 10/1973 | Ross | 364/900 |
| 3,976,976 | 8/1976 | Khosharian | 364/200 |
| 3,979,725 | 9/1976 | Disparte et al. | 364/200 |

Primary Examiner—Leo H. Boudreau
Attorney, Agent, or Firm—John S. Solakian; Nicholas Prasinos; Ronald T. Reiling

[57] ABSTRACT

A control store having a first portion for storing system operation instructions (opcodes), a second portion for storing control store addressing information, wherein the second portion includes a greater number of storage locations than does the first portion in order to efficiently store different control store address information which may be required for the same opcode. Addressing apparatus coupled to address a location in the first portion and any one of at least two corresponding locations in the second portion is provided, thereby minimizing the number of locations required in the first portion of the control store.

10 Claims, 4 Drawing Figures

CONTROL STORE ORGANIZATION IN A MICROPROGRAMMED DATA PROCESSING SYSTEM

BACKGROUND OF THE INVENTION

The present invention generally relates to data processing systems and more particularly to the organization of a so-called control store which is included in microprogrammed data processing systems.

In microprogrammed data processing systems, a control store having a plurality of locations is included whereby a substantial number of the operations as desired in the system are controlled by so-called firmware words included in each of such locations. Such microprogramming allows the system to be more flexibly operated, and avoiding committed logic to a large extent, by simply changing such firmware words thereby increasing the available computing power. The content of a firmware word is utilized to control a step in the data processing system's operation. The firmware words are linked together to provide a series of steps or instructions, i.e., a routine. Such linking is provided based upon various test conditions including the next address information of the current firmware word. The system requires that the control store be able to address itself based upon its own internal address information in each location and based on such test conditions. The address information contained in each such location of the firmware word are much more numerous than the number of opcodes which are included in the command field portion of each firmware word. Stated another way, each particular opcode may be grouped with different address codes. Thus, the opcodes are repeated much more often so as to be grouped with the various address codes which are required therewith under various conditions. For example, the various steps as represented by the opcodes may be arranged in different combinations to provide different firmware routines. Thus, the same opcode in different firmware words would include different next address information included therewith. Because of the redundancy of such opcodes, the storage locations in the control store are used to store the same information, thereby increasing cost and space required in the system.

It is accordingly a primary object of the present invention to provide a microprogrammed data processing system having an improved control store organization.

SUMMARY OF THE INVENTION

The above stated object and other objects of the present invention are achieved by providing a data processing system having apparatus, responsive to a first group of signals, for generating an address including a least significant portion and a most significant portion, the most significant portion having either a first or second state, a first storage device having a first plurality of word locations, each of such word locations having a first plurality of bit locations, a second storage device having a first plurality of word locations, each of such word locations having a second plurality of bit locations, and a third storage device having a second plurality of word locations, each of such word locations having a second plurality of bit locations, each of such word locations of the third storage means having positions corresponding to those of the second storage device. The first storage device includes command information for controlling the operation of the system and the second and third storage devices include address information indicative of the first group of signals. The system further includes a first addressing logic for addressing the first storage device with the least significant portion of such address, and second addressing logic for addressing the second and third storage devices with the least significant portion and the most significant portion of such address, such second addressing logic including apparatus for addressing the second storage device if the most significant portion is in the first state and further apparatus for addressing the third storage device if the most significant portion is in the second state, whereby the same such command information is addressed when either the word location in a corresponding location of the second storage device or the word location in the corresponding location of the third storage device is addressed.

BRIEF DESCRIPTION OF THE DRAWINGS

The features and advantages of the present invention will become more clearly apparent from the following descriptions which are illustrated by the accompanying drawings in which.

DETAILED DESCRIPTION OF THE PREFERRED EMBODIMENT

Figure 1:
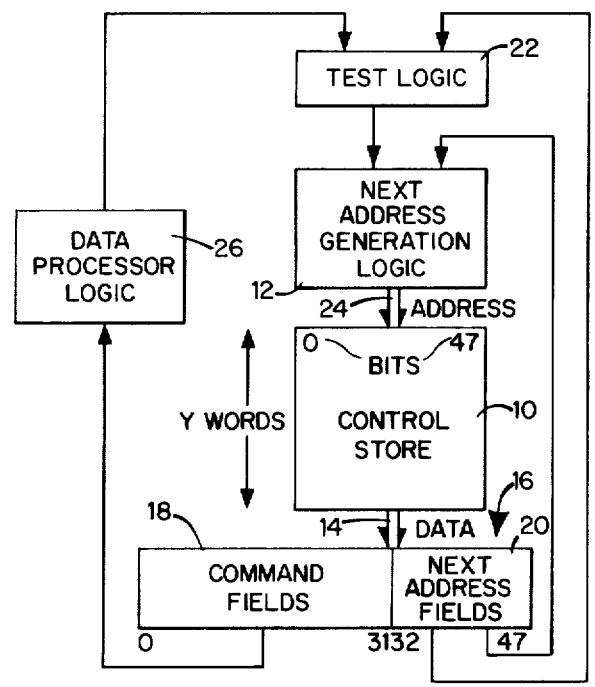
FIG. 1 is a general block diagram of the present invention.

FIG. 1 illustrates a general block diagram of the data processing system of the present invention. Such system basically includes a control store 10 which by way of example includes a plurality of words, Y in number, each of which words, sometimes referred to as so-called firmware words, include by way of example 48 bits (bits 0 through 47). Control store 10 is addressed by means of next address generation logic 12 which may by way of example be that next address generation logic described in pending patent applications Ser. Nos. 674,517 and 674,698, both filed on April 7, 1976. The firmware word addressed in control store 10 is received via data lines 14 in control store register 16. Control store register 16 basically comprises two portions, namely, the command fields 18 and the next address fields 20. By way of example, command fields 18 include 32 bits (bits 0–31) and next address fields 20 include 16 bits (bits 32–47).

The address information in the next address fields 20 is utilized to address control store 10 in combination with the test logic 22 and the next address generation logic 12. Test logic 22 is also described by way of example in the two abovereferenced patent applications. For example, some of such bits in the next address fields 20 may be utilized to provide a base address via logic 12 whereas certain address information included in the address fields may be sent directly to test logic 22. The output of test logic 22 is combined with the other input to logic 12 to provide the address via lines 24 to address control store 10. The other input to test logic 22 is received from data processor logic 26 which may for example include all other logic included in the data processing system. For example, such logic includes an arithmetic unit and various registers included in the ystem which provide the operation intended for the ystem in response to the command information included in the command fields 18. Based on the operation provided by such data processor logic 26, it may direct certain test information to logic 22 which utilizes that information to provide the next address via logic 2. Data processor logic 26 may for example also include a so-called watchdog timer which is useful for indicating a malfunction in the system. If the watchdog interrupt or other time out signal is received, then instead of addressing the next intended firmware word in control store 10, a firmware word may be addressed so as to service such interrupt condition.

Figure 2:
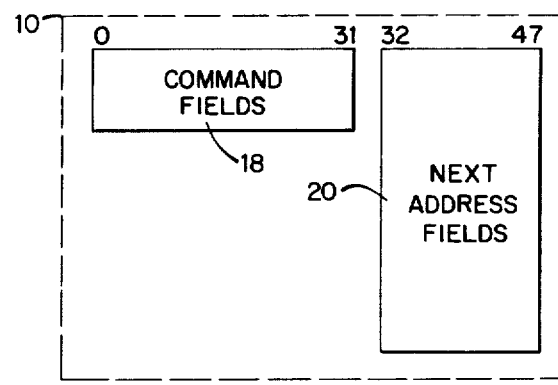
FIG. 2 illustrates in a general manner the configuration of the control store of the present invention.

The control store 10 as shown generally in FIG. 2 includes basically two portions. Command fields portion 18 includes a plurality of operation codes or op-codes which are utilized to command or control the execution of the system. Typically, these operation codes are linked together so as to provide a series of instruction codes, i.e., a routine which provides the intended operation. For example, to read information from memory may require one firmware word to request the data from the memory and one or two other firmware words in order to receive the address and data from memory. Thus, these firmware words are linked together so as to provide a series of steps by which the complete read operation is provided. Such linking is provided by use of the next address fields 20. The next address fields 20 typically include for each such operation code the address of the next firmware word to be addressed after the execution of the instruction provided by the command field of the present firmware word. Such next address included in fields 20 may be modified based upon the test conditions as provided by test logic 22. Next address fields 20 may include different address information associated with the same operation code. For example, one such firmware word may be utilized to request utilization of a common resource, such as memory, which is included in the system. Address information associated with such request if for example a read operation is to be performed, may include an address to the firmware word which in fact designates the read operation. On the other hand, the next operation after such request for the common resources may be a write operation in which case the next firmware word would be different. Accordingly, the request command may be followed by more than one type of command code.

Thus the command codes included in command fields 18, which may be for example 512 in number, may each be associated with more than one next address field included in fields 20. Accordingly as can be seen by FIG. 2, the next address fields 20 portion of the control store 10 must have more word locations than there are command fields 18 portions of control store 10. Further, the command fields must be linked with the next address fields so that upon addressing the control store 10, the proper command code and next address information is received in control store register 16. That is to say, the same command code may be received in register 16 with different next address fields. It is highly desirable to accomplish this function without a requirement of the added memory locations in the control store 10 for the redundant command fields portions thereof.

Figure 3:
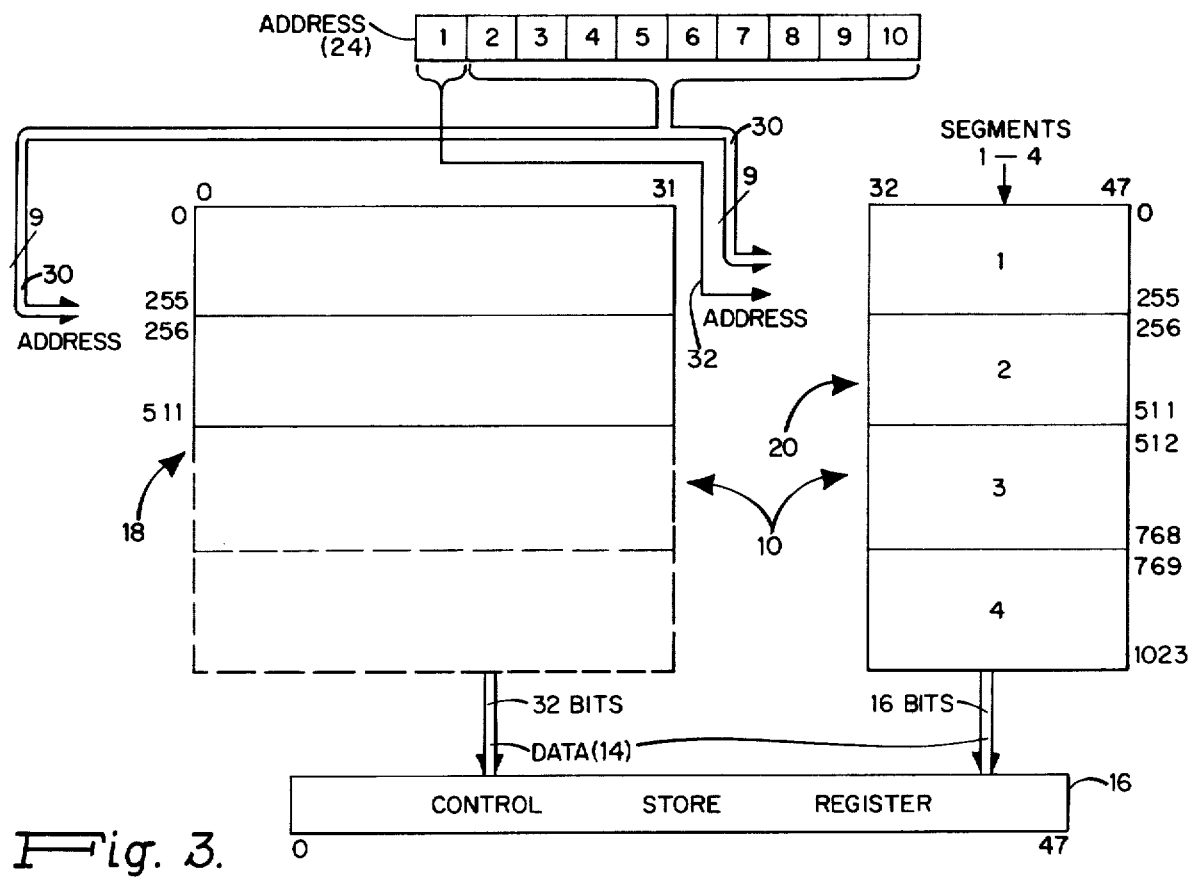
FIG. 3 illustrates the apparatus of the present invention.

The apparatus of the present invention is shown more specifically in FIG. 3. As can be seen, the control store 10 includes two main portions 18 and 20. The outputs of such portions are coupled via the data lines 14 for receipt of the firmware word by control store register 16. The addressing of control store 10 is provided by the address lines 24 as illustrated via bits 1-10, with bit 1 being the most significant bit. The control store is by way of example shown to include 512 word locations in portion 18, with the dotted line portions thereof not actually being in the system but actually representing the number of word locations saved, and accordingly not necessary, by the technique of the present invention.

Figure 4:
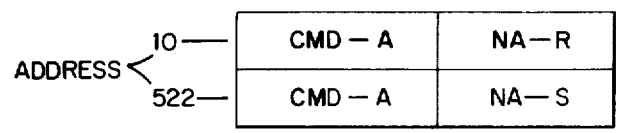
FIG. 4 illustrates firmware words which may be fetched in the control store of the present invention.

The next address fields portion 20 of control store 10 includes by way of illustration four segments with a total of 1024 word locations. Thus, the number of locations in portion 20 is twice that of portion 18. It is noted by way of example, that the number of bits in each word location of portion 20 is 16 bits and that each word location of portion 18 is 32 bits. The apparatus of the present invention enables the use of the command codes or words in the 512 locations of portion 18 which when addressed causes one such command word to be provided to the first 32 bit locations in register 16. At the same time that such command word is addressed in portion 18, either one of two next address words will be addressed in portion 20. More specifically, as can be seen by FIG. 4, if location 10 of portion 18 is addressed, this will mean that such location 10 in the top segment of portion 18 will be transferred to the first 32 bit locations in register 16 and the next address information in word 10 as found in segment one will be transferred to the last 16 bit locations of register 16. Alternatively, if location 522 is addressed in the control store 10, then the command word in location 10 of portion 18 will be transferred to register 16 and the next address information in location 522 of portion 20 will be sent to the last 16 bit locations of register 16. Thus, even though two different addresses are provided, the same command word is sent to register 16 so long as they are at so-called corresponding locations in the command fields portion 18. By corresponding locations, what is meant is that by way of example location 0 corresponds to location 512, which for portion 18 is non-existent, location 511 corresponds to location 1024, etc. See FIG. 4 which illustrates the content received in register 16, when either location 10 or location 522 of control store 10 is addressed. As can be seen, the opcodes are the same and the next address information is different.

Thus, the address 24, which by way of example is 10 bits wide thereby enabling the addressing of 1024 locations, includes bit lines 30, which are 9 in number and which are the least significant bits of the address so as to enable the addressing of up to 512 locations and includes the address line 32, which is the most significant bit, thereby enabling the addressing of up to 1024 locations. The least significant bits on line 30 are provided to address the 512 locations of portion 18. Thus, the bits on line 30 will address the selected location in portion 18 regardless of the state of the most significant bit on address line 32. If the bit represented by address line 32 is a binary zero, one of the first 512 locations in segments 1 and 2 of portion 20, will be addressed. Thus for example, if location 10 is addressed in portion 18, then location 10 will be addressed in portion 20. If line 32 is in the binary one state, then one of the locations in segments 3 or 4 in portion 20 will be addressed when addressing either one of the 512 locations in portion 18. Thus, by way of example, if location 10 is addressed in portion 18, with line 32 in a binary one state, then location 522 will be addressed in portion 20. Thus, any one of a plurality of command instructions may be fetched from the command fields portion 18 and any one of two next address words may be fetched from the next address fields portion 20 so as to eliminate the need for anymore than the 512 locations in portion 18, even though more than 512 locations are needed in portion 20. Thus, the dotted line locations shown with respect to portion 18 are not required so long as the address fields are mapped in correspondence with the command words so as to produce the desired result. It can be seen that various combinations may be elected such as for example, the next address words in segment 3 may have been linked with either one of the first two segments of portion 18, this being accomplished by providing further control of the second most significant bit, i.e., bit two of address 24.

Having described the invention, what is claimed as new and novel and for which it is desired to secure Letters Patent is:

1. A data processing system comprising:
   a. means, responsive to a first group of signals, for generating an address including a least significant portion and a most significant portion, said most significant portion having either a first state or a second state;
   b. first storage means having a first plurality of word locations, each of said word locations having a first plurality of bit locations;
   c. second storage means having a first plurality of word locations, each of said word locations having a second plurality of bit locations;
   d. third storage means having a second plurality of word locations, each of said word locations having a second plurality of bit locations, each of said word locations of said third storage means having positions corresponding to those of said second storage means;
   e. wherein said first storage means includes command information for controlling the operation of said system and wherein said second and third storage means includes address information representative in part of said first group of signals;
   f. first means for addressing said first storage means with said least significant portion of said address; and,
   g. second means for addressing said second and third storage means with said least significant portion and said most significant portion of said address, said second means for addressing including means for addressing said second storage means if said most significant portion is in said first state and means for addressing said third storage means if said most significant portion is in said second state, whereby the same said command information is addressed when either a said word location in a corresponding location of said second storage means or a said word location in a corresponding location of said third storage means is addressed.

2. A system as in claim 1 wherein said first, second and third storage means are collectively included in a single control store memory for controlling various operations in said system, said memory addressed by said address generated by said means for generating.

3. A system as in claim 2 wherein said first plurality of word locations is equal in number to said second plurality of word locations.

4. A system as in claim 2 wherein each of said first, second and third storage means have a beginning address and wherein said corresponding locations in each of said storage means are the same number of locations from their respective beginning addresses.

5. A system as in claim 1 wherein said most significant portion comprises a single address bit and wherein said least significant portion comprises a plurality of address bits sufficient in number to fully address either said second storage means or said third storage means, the number of said plurality of address bits related to the number of locations in either said second or third storage means.

6. A system as in claim 1 wherein said first, second and third storage means each comprise first and second segments and wherein said first and second means for addressing include means for addressing either said first segment of said second storage means or said first segment of said third storage means when said first segment of said first storage means is addressed and further means for addressing either said second segment of said second storage means or said second segment of said third storage means when said second segment of said first storage means is addressed.

7. A system as in claim 1 further comprising:
   a. data processing logic, responsive to said command information, for executing the operation indicated by said command information, said logic including means for indicating the operational status of said system; and,
   b. test logic, responsive to said address information and coupled for response to the indication of the operational status of said system, for providing said first group of signals to said means for generating.

8. A data processing system comprising:
   a. a first memory having a plurality of locations for storing control words;
   b. a second memory having a plurality of locations for storing address words;
   c. a third memory having a plurality of locations for storing address words;
   d. means, responsive to next address signals, for addressing said first memory and simultaneously therewith addressing either said second memory or said third memory;
   e. wherein said first, second and third memories each have a beginning address, and wherein said locations in each of said memories correspond to each other, each said corresponding location being the same number of locations from their respective beginning address; and wherein
   f. said means for addressing further comprising means for enabling the transfer from said memories of a said control word and either one of two different address words, said means for enabling including means for addressing one said corresponding location in said first memory and one said corresponding location in either said second memory or said third memory.

9. A system as in claim 8 wherein said means for addressing include means for generating a most significant address and a least significant address, and wherein said means for addressing includes means for enabling the addressing of said first, second and third memories by said least significant address, and means for selecting either said second or third memory for addressing by means of said most significant address.

10. A system as in claim 9 further comprising:
   a. data processing logic, responsive to said control words, for executing an operation indicated by said control word, said logic including means for indicating the operational status of said system; and,
   b. test logic, responsive to said address words from either said second or third memory and coupled for response to the indication of the operational status of said system, for providing said next address signal to said means for addressing.

* * * * *